United States Patent [19]

Mann

[11] 3,903,263

[45] Sept. 2, 1975

[54] COMPOSITION AND METHOD FOR PREVENTING WINTER DYSENTERY, DIARRHEA OR RINGWORM IN RUMINANTS

[75] Inventor: Elton W. Mann, Hershey, Pa.

[73] Assignee: Hershey Foods Corporation, Hershey, Pa.

[22] Filed: Oct. 2, 1973

[21] Appl. No.: 402,869

Related U.S. Application Data

[60] Continuation-in-part of Ser. No. 395,661, Sept. 18, 1973, which is a continuation-in-part of Ser. No. 306,221, Nov. 13, 1972, abandoned, Continuation-in-part of Ser. No. 121,199, March 4, 1971, Pat. No. 3,819,829, and Ser. No. 367,749, June 7, 1973, which is a division of Ser. No. 672,462, Oct. 3, 1967, Pat. No. 3,617,448, which is a continuation-in-part of Ser. No. 334,907, Dec. 31, 1963, abandoned.

[52] U.S. Cl. .................................................. 424/93
[51] Int. Cl.² ........................................ A61K 37/00
[58] Field of Search .................................... 424/93

[56] References Cited

UNITED STATES PATENTS

| 1,929,085 | 10/1933 | Suchs ................................. 424/93 |
| 2,744,015 | 5/1956 | Katsube et al. ..................... 424/93 |
| 3,072,528 | 1/1963 | Kludas et al. ...................... 424/93 |
| 3,369,969 | 2/1968 | Nouvel ................................ 424/93 |

*Primary Examiner*—Albert T. Meyers
*Assistant Examiner*—Norman A. Drezin
*Attorney, Agent, or Firm*—Seidel, Gonda & Goldhammer

[57] ABSTRACT

Ruminants are treated by being fed spores of *Bacillus uniflagellatus* (ATCC No. 15,134) as parts of their diet. As a result, winter dysentery and diarrhea are substantially avoided. Moreover, in ruminants afflicted with ringworm the ringworm is inactivated, and ruminants not afflicted with ringworm prior to treatment do not contract ringworm during treatment.

7 Claims, No Drawings

COMPOSITION AND METHOD FOR PREVENTING WINTER DYSENTERY, DIARRHEA OR RINGWORM IN RUMINANTS

CROSS-REFERENCE TO RELATED APPLICATIONS

This application is a continuation-in-part of my copending patent application Ser. No. 395,661, filed Sept. 18, 1973, which is in turn a continuation-in-part of my now abandoned patent application Ser. No. 306,221, filed Nov. 13, 1972.

This application is also a continuation-in-part of my copending patent applications Ser. No. 121,199, filed Mar. 4, 1971, now U.S. Pat. No. 3,819,829, and Ser. No. 367,749, filed June 7, 1073, which are divisionals of my patent application Ser. No. 672,462, filed Oct. 3, 1967, now U.S. Pat. No. 3,617,448, issued Nov. 2, 1971, which was in turn a continuation-in-part of my now abandoned application Ser. No. 334,907, filed Dec. 31, 1963.

The disclosures of each of said patent applications is incorporated herein by reference.

BACKGROUND OF THE INVENTION

The present invention relates to a composition and method for preventing winter dysentery or diarrhea, or ringworm, in ruminants. More particularly, the invention is directed to a composition and method involving feeding ruminants with spores of *Bacillus uniflagellatus*.

The microorganism employed in the practice of my invention is designated *Bacillus uniflagellatus*. A culture of the organism is on deposit with the American Type Culture Collection (ATCC No. 15,134), and is available to the public from the American Type Culture Collection, 12301 Parklawn Drive, Rockville, Md. 20852.

The morphological and physiological characteristics of *Bacillus uniflagellatus* are set forth in detail in my U.S. Pat. No. 3,617,448, issued Nov. 2, 1971, and entitled "Antibiotic and Methods of Producing and Using It."

Other published materials relating to *Bacillus uniflagellatus*, the disclosures of which are incorporated herein by reference, are my papers: *Bacillus uniflagellatus: Sp.N. Its Unusual Characteristics*, The Southwestern Naturalist 13(3), 349–352, Dec. 10, 1968; *Inhibition of Tobacco Mosaic Virus By A Bacterial Extract*, Phytophathology, Vol. 59, No. 5, 658–662, May 1969; and *Rabies and Its Diagnosis* (1968).

Winter dysentery and diarrhea, are two serious diseases with ruminants, and adversely affect the gain in weight of such animals. In severe cases, these diseases, particularly winter dysentery, may prove fatal to the animal. Animals with these diseases require larger amounts of feed to achieve a given amount of weight gain.

In addition, the fungal infection, ringworm, is a common disease among ruminants. At the least, ringworm leads to severe discomfort on the part of the animal. It may cause the animal to injure itself by scraping itself against the wire or fences. In severe cases, the disease can seriously damage the animal and may even lead to fatal consequences.

Ruminants which include cattle, sheep, goats, deer, and buffalo, constitute among the most important sources of the world's animal-derived food. A limiting factor on the availability of this food is the weight gain achieved by the ruminants per given unit of feed. Anything which adversely interferes with such weight gain, such as the ruminant diseases, winter dysentery, diarrhea and ringworm, constitutes a limiting factor on the world's animalderived food supply.

This invention has as an object the provision of a composition for preventing winter dysentery, diarrhea and ringworm in ruminants.

This invention has as another object the provision of an animal feed which prevents the spread of highly infectious winter dysentery, diarrhea and ringworm in ruminants.

BRIEF SUMMARY OF THE INVENTION

The above and other objects are accomplished by the present invention which comprises incorporating spores of *Bacillus uniflagellatus* in feeds given to ruminants, and the method for preventing winter dysentery, diarrhea and ringworm in ruminants by feeding them spores of *Bacillus uniflagellatus*.

The spores of *Bacillus uniflagellatus* may be fed to the ruminants by being dispersed in their feed, with such spores being uniformly dispersed on a carrier. The feed may be either the animal's normal solid feed, or in the case of very young ruminants, such as day old animals, in the milk fed to the ruminant.

Throughout this specification, and the appended claims, when the spores are referred to, unless the meaning is clearly otherwise, the spores referred to are those spores of *Bacillus uniflagellatus*, which after germination within the digestive tract of the ruminant, release antibiotic. Thus, not all spores of *Bacillus uniflagellatus* release antibiotic on germination within the digestive tract of ruminants. For example, when *Bacillus uniflagellatus* is grown in a chocolate by-products medium containing very high concentration of glucose, such as about 30 grams glucose per liter, the spores produced from such media rarely, if ever, are efficacious for preventing winter dysentery, diarrhea or ringworm in ruminants because such spores do not release antibiotic upon germinating within the digestive tract of the ruminant. A chocolate by-products medium should preferably contain at least about 10 grams per liter of glucose to yield an appreciable amount of spores and antibiotic. A sugar, such as sucrose, which yields glucose on being split by the *Bacillus uniflagellatus* may be used in place of the glucose in the culture medium. In most media, sucrose is to be preferred to glucose, both because it is cheaper, and because the bacteria must split it before it can use the glucose. This minimizes the presence of excess glucose.

DETAILED DESCRIPTION

*Bacillus uniflagellatus* may be grown in several nutrient media to yield the antibiotic referred to in U.S. Pat. No. 3,617,448. U.S. Pat. No. 3,617,448 discloses suitable carrot, and casamino acid media. Another suitable culture medium may be derived from chocolate manufacture by-products, such as presscake and expeller cake.

Presscake is a by-product of the confectionery industry. It is prepared by subjecting a mixture of chocolate and confectionery products, such as scrap candy, miswrapped candy bars from which cocoa butter has been pressed, to pressures of the order of 80 to 7000 psi and temperatures of 125° to 250°F., and then granulating the product. The ingredients will vary greatly depending on the starting materials but will normally include cane sugar, milk solids, cocoa, cocoa butter, peanuts and almonds. An example of one form of presscake may have an analysis of 12 weight percent protein, 7 weight percent fat, and 3 weight percent fiber, although the analyses will vary depending upon the raw material. The present major use of presscake is as animal feed.

Expeller cake is derived from cocoa shell fragments and dust from which cocoa butter has been expelled by temperature and pressure. Commercial equipment is available for obtaining expeller cake from lumps of whole unroasted cocoa beans, roaster clean-down and various shell fractions from the shelling process. The normal temperatures used to obtain expeller cake are of the order of 200° to 350°F. Following pressurization, the expeller cake is granulated. Like presscake, expeller cake is a conventional material of commerce, and a by-product of the candy industry.

By way of example, and not by way of limitation, spores of Bacillus uniflagellatus which yield antibiotic on germination may be derived from a chocolate by-produce presscake and expeller cake nutrient medium as follows:

EXAMPLE A 650 grams of 100 mesh expeller cake, 100 grams of 100 mesh presscake, 2 grams of ammonium nitrate, and 2 grams of ammonium chloride were blended into 10 liters of distilled water with vigorous agitation. The resultant mixture was then sterilized by autoclaving at a pressure of 15 pounds per square inch gauge for over 1 hour. Therefore, the medium was inoculated with a culture of Bacillus uniflagellatus with the medium being maintained at a temperature of 32°C. Air was bubbled through the inoculated medium (Bacillus uniflagellatus is aerobic) for from 12 to 14 days.

The mixture is then centrifuged to remove all solid materials.

The aqueous material from the centrifuge may then be extraced with ether for antibiotic production.

To retrieve the spores from the centrifuged bottom material, the bottom material is vacuum dried to a solid cake while at a temperature of 80°C. After drying, the hard cake is ground and sifted to the extent that it will pass through a 100 mesh screen. If desired, other mesh sizes may be used, such as within a range of from 50 to 325 mesh.

Yet another method of producing spores of Bacillus uniflagellatus which yield antibiotic on germination within the digestive tract to ruminants is set forth below:

EXAMPLE B 300 grams of 100 mesh expeller cake, and 100 grams of 100 mesh presscake are blended into 10 liters of distilled water, and the mixture thoroughly agitated to ensure complete diffusion of the solids throughout the liquid. The 10 liter mixture is then placed in a steam sterilizer at a pressure of between 15 and 20 psi for a period of 90 minutes.

Upon its removal from the sterilizer, and cooling to 32° to 34°C. it is inoculated with a sporulated culture of Bacillus uniflagellatus, as from an agar slant, which is melted by heat and poured into the water.

The mixture may be treated in a 12 liter flask by maintaining it at a temperature of 32° to 34°C. and agitating it and providing oxygen to it by bubbling filtered air through it for a period of 14 days. The temperature of 32°C. to 34°C. is to be preferred, although somewhat higher and lower temperatures may be used.

The mixture may then be centrifuged and the liquid removed for extraction for antibiotic recovery. The solids may be separated and dried, ground and sifted, and collected as a dust containing the spores.

Alternatively, the entire culture at the end of the 14 days may be passed through a spray drier, removing the water and recovering both the spores and the antibiotic in the form of fine dust. This latter procedure is to be preferred since it avoids the need for centrifuging, drying, grinding, sifting, and collecting.

Growth stimulators may be added to the expeller cake-presscake culture medium to increase the yield of viable cells of Bacillus uniflagellatus. I have found that an outstanding growth stimulator for Bacillus uniflagellatus in chocolate by-product media is peanut heart. Although whole peanuts perform as well as a growth stimulator as peanut hearts, the peanut hearts are to be preferred because of their far lower price. Thus, in many confections, it is desirable to separate the peanut hearts from the peanuts, due to the relative unpalatable taste and shortened shelf life of the peanut hearts. Separation of peanut hearts from peanuts may be accomplished by well-known commercial procedures which are presently empolyed in the confection industry. Peanut hearts and peanuts are not a growth stimulator for Bacillus uniflagellatus with carrot-based culture media.

To illustrate the growth stimulation affect of peanut hearts on Bacillus uniflagellatus, a comparison was made between a control culture medium of expeller cake, presscake, ammonium nitrate, and ammonium chloride, as set forth above in Example A, and an identical medium which also contained an aqueous peanut heart extract. The peanut hearts were present (although derived from an aqueous extract) to the extent of 4 weight percent peanut hearts based on the total solid components of the culture medium. With the control culture medium, an average of 16,920,000 viable cells per ml were obtained after 72 hours of fermentation at 32°C. while with the identical medium containing the peanut heart extract an average of 42,620,000 viable cells per ml were obtained after 72 hours of fermentation at 32°C.

A preferred method of producing spores of Bacillus uniflogellatus which yield antibiotic on germination within the digestive tract of ruminants, and which uses peanut hearts as a stimulator is as follows:

EXAMPLE C 400 grams of 100 mesh expeller cake, and 100 grams of 100 mesh presscake, and 137.5 grams of peanut hearts are blended into 11 liters of distilled water, and the mixture thoroughly agitated to ensure complete diffusion of the solids throughout the liquid. The 11 liter mixture is then placed in a steam sterilizer at a pressure of between 15 and 20 psi for a period of 90 minutes.

Upon its removal from the sterilizer, and cooling to 32°C to 34°C. it is inoculated with a sporulated culture by Bacillus uniflagellatus, as from an agar slant, which is melted by heat and poured into the mixture.

The mixture may be treated in a 12 liter flask by maintaining it at a temperature of 32° to 34°C. and agitating it and providing oxygen to it by bubbling filtered air through it for a period of 14 days.

The mixture is then allowed to settle and the supernatant liquid decanted off for extraction and antibiotic recovery. The residue is passed through a spray drier removing the water and recovering both the spores and the antibiotic in the form of fine dust. This latter procedure is to be preferred since it avoids the need for centrifuging, drying, grinding, sifting, and collecting.

When the spores of *Bacillus uniflagellatus* are produced in accordance with any of the above described methods, the spores are recovered in a substantially uniform dust or powder with the remains of the culture medium in which the spores were produced. This dust or power provides an inexpensive, inert carrier which problem avoids the use of wastefully high concentrations of spores and assures more even distribution of available spores, protects the spores against abrasion when being used and is substantially nontoxic to ruminants and to the spores. The carrier also protects the spores against excessive aeration. In addition, these methods of production have the extremely beneficial advantage, both economically and ecologically, of having no fermentation waste to dispose of. Thus, whereas most fermentation processes entail the expense and problems of disposing of the fermentation medium solids, all of the solids are retained with the product according to the present invention.

In order to prevent the spores from germinating prior to treatment of ruminants, the water content of the combined spores and powdered carrier should be controlled so that it does not exceed 10 weight percent water. There is normally no economic justification to reduce the weight percent of the water to below 4 weight percent. By "weight percent water" as used herein is meant a determination obtained by comparing the initial weight to the weight after tray draying for 48 hours at 100°C. under a 27 inch vacuum (a vacuum equal to about 3 inches of mercury absolute pressure, or 1/10 atmosphere pressure).

In this manner, the spores will have a shelf life of many months. Thus, I have found that a substantially uniform dispersion of between 24,000,000 and 29,000,000 spores per gram on the aforesaid carrier having less than 10 weight percent water, lost approximately 25% of its potency when stored for 6 months at room temperature in a capped container.

The carrier derived from the culture medium should be cheap, stable on storage, inert, and non-toxic to ruminants and to *Bacillus uniflagellatus*.

In order to provide an economical and effective mixture for treating ruminants, production of the spores should be controlled to yield approximately 100,000 to 1,000,000,000 spores per gram of the mixture which includes the spores and the inert dust or powdered carrier. While higher and lower concentrations may be used, they are uneconomic, so that the foregoing range is preferred. The method of Example C above all produce on the average of about 29,000,000 powdered spores per gram of the forwarded mixture, and the spores constitute below about 0.5 weight percent of the mixture. I believe that there are about 325,000,000,000 to 350,000,000,000 spores in a gram of pure spores.

An analysis of the powdered mixture produced by the method of Example C above reveals the following:

| Ingredient | Weight Percent |
|---|---|
| Total fat | 9.76% |
| Total protein | 24.6% |
| Total ash | 5.9% |
| Total carbohydrates (calculated as starch) | 11.1% |
| Total reducing sugars (calculated as glucose) | 1.25% |

A number of methods may be used to feed the spores and carrier to ruminants. Thus, the animals may be fed the spores directly, if need be, by forced feeding. Alternatively, and preferably, the spores may be incorporated into the animal's feed. I have found that use of the spores and carrier derived from the aforesaid Examples A, B and C can be fed directly to ruminants as part of their feed, without rendering the feed non-palatable. This is true both with solid feeds, such as grain, and with liquid feeds, such as milk.

While theoretically a single germinating spore will release some antibiotic, I have found that at least 10,000,000 spores should be ingested each day during the treatment, and preferably 100,000,000 or more spores per day. Since I have not detected any noticeable toxicity in the spores or the antibiotic derived from the spores to ruminants, there is no sharply defined maximum amount of spores to be included in the daily diet of the ruminant. However, as a practical matter, I do not believe that in most ruminants there is an economical justification for exceeding the dosage of 1,000,000,000 spores per day.

The duration of treatment should be for a sufficient time to ensure that the spores will germinate within the rumen. In some instances, a single treatment is sufficient. Generally speaking, I prefer to extend the treatment for at least 1 week, namely having the animal ingest the spores each day for a week. If feasible, the treatment may be advantageously extended to a period of 2 to 3 months. Since no noticeable harm results from treatment with the spores of *Bacillus uniflagellatus*, the added assurance of prevention of winter dysentery, diarrhea, and justifies justifices protracted treatments.

The invention may be more fully understood by reference to the following examples. It is to be understood that the examples are merely for illustration, and are not for the purpose of limitation.

EXAMPLE 1

Dairy beef steers, and heifers, Holstein, Holstein-Angus Cross, and Holstein-Charlois Cross, from 22 dairies, were treated within a barn. In each instance, the treatment was commenced when the animal was about 3 months old and continued for either 2 to 3 months. Thus, the treatment was commenced when the animal was 3 months old and discontinued when the animal was either 5 months or 6 months old. The weights of the animals being treated ranged between 180 pounds and 500 pounds.

Between November 1972 and September 1973, 94 head were treated with the spores of *Bacillus uniflagellatus* dispersed on a carrier. The concentration of the spores ranged from 9,000,000 to 20,000,000 spores per gram dispersed on a carrier and derived by the method of Example C. Each calf was fed twice a day, with each feeding being ¼ ounce of the spores and carrier, so that the total feeding each day was one-half ounce of the spores and carrier.

Of the 94 head treated during this 10 month period, not one developed winter dysentery or diarrhea. Some of the animals came into the barn with ringworm. However, the ringworm in each instance appeared to be inactivated. Thus, attempts to culture the ringworm from such animals which had been treated with the spores of *Bacillus uniflagellatus* proved to be unsuccessful.

Animals from the same 22 dairies in the previous year suffered approximately 50% winter dysentery or diarrhea. Moreover, about 80% of such animals had ringworm.

EXAMPLE 2

A group of 8 newborn Guernsey calves were being raised together in a separate barn. Viral scouring, a highly contagious diarrhea due to a specific virus, developed in the mother and two of these calves. Normally, viral scouring spreads rapidly through all calves kept in the same barn. The mother and two calves having the viral scouring died of it. The other six calves were treated with ½ ounce of spores of *Bacillus uniflagellatus* on a carrier, with the concentration of the spores being between 9,000,000 and 20,000,000 spores per gram. The half ounce of *Bacillus uniflagellatus* spores and carrier was dispersed within the calves' milk, namely ½ ounce of the spores and carrier per 2 quarts of milk. Each of the six calves being treated drank the milk readily. The treatment was extended for the first 3 weeks of each calf's life. Without exception, within 1 week no sign of scouring was noted in any of the calves.

If desired, pure *Bacillus uniflagellatus* spores may be fed to the ruminants. However, this is wasteful of the spores due to the large number of spores per gram. For the reasons heretofore given, I prefer to use the spores dispersed on a carrier.

In the following toxicity tests the sample being tested contained 32,000,000 spores per gram on a carrier derived from chocolate by-products.

Extensive toxicity testing with mammals hhave revealed no significant toxicity to the spores of *Bacillus uniflagellatus*. By way of example, skin irritation studies on rabbits pursuant to the Hazardous Substances Labeling Act Regulations, Part 191, Chapter 1, Title 21, Code of Federal Regulations, paragraph 191.11 performed on six rabbits with doses of 0.5 ml. per patch, with four patches on each rabbit, revealed a primary skin irritation index of 0.0.

An inhalation toxicity test performed on 10 rats pursuant to the Hazardous Substances Labeling Act, Part 191, Chapter 1, Title 21, Code of Federal Regulations, paragraph 191.1, with the maximum dose of 500 ml. per liter inhaled for 1 hour did not produce any toxic or lethal effects. Larger doses could not, conveniently, be used in tests without burying the rats. All test animals kept eating the spore dust, and showed a rapid weight gain. No toxicity, irritation or lethality was observed.

The dermal $LD_{50}$ was tested for in rabbits using the test procedure set forth in "Appraisal Of The Safety Of Chemicals In Foods, Drugs and Cosmetics", published by the Association of Food And Drug Officials of the United States.

One male and one female rabbit were used at each dose level.

| Findings: | Rabbit | Dose Gm/kg | Hyperemia | Edemia | Deaths |
|---|---|---|---|---|---|
| | 1 M | 5 | 0 | 0 | 0 |
| | 2 F | 5 | 0 | 0 | 0 |
| | 3 M | 10 | 0 | 0 | 0 |
| | 4 F | 10 | 0 | 0 | 0 |
| | 5 M | 15 | 0 | 0 | 0 |
| | 6 F | 15 | 0 | 0 | 0 |
| | 7 M | 20 | 0 | 0 | 0 |
| | 8 F | 20 | 0 | 0 | 0 |
| | 9 M | 25 | 0 | 0 | 0 |
| | 10 F | 25 | 0 | 0 | 0 |

None of the animals exhibited any skin reactions within the 2 week observation period.

Because of the bulk of the test sample doses larger than 25 gm. per kg. could not be employed.

An oral $LD_{50}$ was performed in rats using the method employed as described in "Appraisal of the Safety of Chemicals in Foods, Drugs and Cosmetics", published by the Association of Food and Drug Officials of the United States.

| Results: | Dose (gm/kg) | No. of Rats | Survivors |
|---|---|---|---|
| | 10 | 10 | 10 |
| | 20 | 10 | 10 |
| | 30 | 10 | 10 |
| | 40 | 10 | 10 |
| | 50 | 10 | 10 |

When larger dose than 50 gm/kg was employed in test, the suspended test material was carried over into the lungs.

The test material, 32,000,000 spores per gm when given orally to rats at a dose level of 50 gm/kg did not produce any toxic or lethal effects in rats. Since lethal doses could not be ascertained an oral $LD_{50}$ could not be determined.

No toxic manifestations were observed at any time after the test material intake. In fact, the animals showed a definite weight increase.

An eye irritation test was rendered using the methods described in the Hazardous Substances Labeling Act Regulations, Part. 191, Chapter 1, Title 21, Code of Federal Regulations, paragraph 191.12.

| Dose: 0.1 gm. in one eye of each of 6 rabbits | | | | | | | |
|---|---|---|---|---|---|---|---|
| Rabbit No. 1 | 1 | 2 | 3 | 4 | 5 | 6 | 7 |
| I. Cornea | | | | | | | |
| A. Opacity | 0 | 0 | 0 | 0 | 0 | 0 | 0 |
| B. Area A×B×5 | 0 | 0 | 0 | 0 | 0 | 0 | 0 |
| II. Iris | | | | | | | |
| A. Values ×5 | 0 | 0 | 0 | 0 | 0 | 0 | 0 |
| III. Conjunctivae | | | | | | | |
| A. Redness | 0 | 0 | 0 | 0 | 0 | 0 | 0 |
| B. Chemoisis | 0 | 0 | 0 | 0 | 0 | 0 | 0 |
| C. Discharge (A+B+C) ×2 | 0 | 0 | 0 | 0 | 0 | 0 | 0 |
| Total | 0 | 0 | 0 | 0 | 0 | 0 | 0 |
| Rabbit No. 2 | | | | | | | |
| I. Cornea | | | | | | | |
| A. Opacity | 0 | 0 | 0 | 0 | 0 | 0 | 0 |
| B. Area A×B×5 | 0 | 0 | 0 | 0 | 0 | 0 | 0 |
| II. Iris | | | | | | | |
| A. Values | 0 | 0 | 0 | 0 | 0 | 0 | 0 |

| | | | | | | | |
|---|---|---|---|---|---|---|---|
| ×5 | | | | | | | |
| III. Conjunctivae | | | | | | | |
| A. Redness | 0 | 0 | 0 | 0 | 0 | 0 | 0 |
| B. Chemosis | 0 | 0 | 0 | 0 | 0 | 0 | 0 |
| C. Discharge | 0 | 0 | 0 | 0 | 0 | 0 | 0 |
| (A+B+C) ×2 Total | 0 | 0 | 0 | 0 | 0 | 0 | 0 |
| Rabbit No. 3 | | | | | | | |
| I. Cornea | | | | | | | |
| A. Opacity | 0 | 0 | 0 | 0 | 0 | 0 | 0 |
| B. Area A×B×5 | 0 | 0 | 0 | 0 | 0 | 0 | 0 |
| II. Iris | | | | | | | |
| A. Values ×5 | 0 | 0 | 0 | 0 | 0 | 0 | 0 |
| III. Conjunctivae | | | | | | | |
| A. Redness | 0 | 0 | 0 | 0 | 0 | 0 | 0 |
| B. Chemosis | 0 | 0 | 0 | 0 | 0 | 0 | 0 |
| C. Discharge | 0 | 0 | 0 | 0 | 0 | 0 | 0 |
| (A+B+C) ×2 Total | 0 | 0 | 0 | 0 | 0 | 0 | 0 |
| Rabbit No. 4 | | | | | | | |
| I. Cornea | | | | | | | |
| A. Opacity | 0 | 0 | 0 | 0 | 0 | 0 | 0 |
| B. Area A×B×5 | 0 | 0 | 0 | 0 | 0 | 0 | 0 |
| II. Iris | | | | | | | |
| A. Values ×5 | 0 | 0 | 0 | 0 | 0 | 0 | 0 |
| III. Conjunctivae | | | | | | | |
| A. Redness | 0 | 0 | 0 | 0 | 0 | 0 | 0 |
| B. Chemosis | 0 | 0 | 0 | 0 | 0 | 0 | 0 |
| C. Discharge | 0 | 0 | 0 | 0 | 0 | 0 | 0 |
| (A+B+C) ×2 Total | 0 | 0 | 0 | 0 | 0 | 0 | 0 |
| Rabbit No. 5 | | | | | | | |
| I. Cornea | | | | | | | |
| A. Opacity | 0 | 0 | 0 | 0 | 0 | 0 | 0 |
| B. Area A×B×5 | 0 | 0 | 0 | 0 | 0 | 0 | 0 |
| II. Iris | | | | | | | |
| A. Values ×5 | 0 | 0 | 0 | 0 | 0 | 0 | 0 |
| III. Conjunctivae | | | | | | | |
| A. Redness | 0 | 0 | 0 | 0 | 0 | 0 | 0 |
| B. Chemosis | 0 | 0 | 0 | 0 | 0 | 0 | 0 |
| C. Discharge | 0 | 0 | 0 | 0 | 0 | 0 | 0 |
| (A+B+C) ×2 Total | 0 | 0 | 0 | 0 | 0 | 0 | 0 |
| Rabbit No. 6 | | | | | | | |
| I. Cornea | | | | | | | |
| A. Opacity | 0 | 0 | 0 | 0 | 0 | 0 | 0 |
| B. Area | 0 | 0 | 0 | 0 | 0 | 0 | 0 |
| A×B×5 | | | | | | | |
| II. Iris | | | | | | | |
| A. Values ×5 | 0 | 0 | 0 | 0 | 0 | 0 | 0 |
| III. Conjunctivae | | | | | | | |
| A. Redness | 0 | 0 | 0 | 0 | 0 | 0 | 0 |
| B. Chemosis | 0 | 0 | 0 | 0 | 0 | 0 | 0 |
| C. Discharge | 0 | 0 | 0 | 0 | 0 | 0 | 0 |
| (A+B+C) ×2 Total | 0 | 0 | 0 | 0 | 0 | 0 | 0 |

The present invention may be embodied in other specific forms without departing from the spirit or essential attributes thereof and, accordingly, reference should be made to the appended claims, rather than to the foregoing specification as indicating the scope of the invention.

I claim:

1. A method for preventing winter dysentery, diarrhea and ringworm in ruminants which comprises feeding an effective amount of at least 10,000,000 spores per day of *Bacillus uniflagellatus* (ATCC No. 15,134) to the ruminants.

2. A method in accordance with claim 1 in which the spores are commingled with the feed being fed to the ruminants.

3. A method in accordance with claim 1 in which the spores are uniformly dispersed on a carrier which is non-toxic and which is palatable to the ruminants.

4. A method in accordance with claim 1 in which the ruminants are cattle.

5. A method in accordance with claim 3 in which the ruminants are cattle.

6. In a feed for ruminants which prevents winter dysentery, diarrhea, and ringworm, wherein the improvement comprises the inclusion therein of at least 10,000,000 spores of *Bacillus uniflagellatus* (ATCC No. 15,134) per daily feed ration.

7. A feed in accordance with claim 6 in which the spores of the *Bacillus uniflagellatus* are uniformly dispersed on a carrier, other than the feed ration, which is non-toxic and palatable to the ruminants.

* * * * *